United States Patent [19]
Haselby et al.

[11] Patent Number: 4,916,638
[45] Date of Patent: Apr. 10, 1990

[54] MEDIA ADVANCE SYSTEM FOR SWATH PRINTERS

[75] Inventors: Robert D. Haselby; Jeffrey S. Best, both of San Diego; Samuel A. Stodder, Encinitas, all of Calif.

[73] Assignee: Hewlett-Packard Company, Palo Alto, Calif.

[21] Appl. No.: 342,927

[22] Filed: Apr. 25, 1989

[51] Int. Cl.⁴ .............................................. H04N 1/40
[52] U.S. Cl. ..................................... 364/519; 346/154
[58] Field of Search ................ 364/518, 519; 346/154, 346/75, 139 R

[56] References Cited

U.S. PATENT DOCUMENTS

| | | | |
|---|---|---|---|
| 4,627,002 | 12/1986 | Blum et al. | 364/519 |
| 4,734,868 | 3/1988 | DeLacy | 364/519 |
| 4,809,021 | 2/1989 | Check et al. | 346/75 |

*Primary Examiner*—Arthur G. Evans
*Attorney, Agent, or Firm*—Roland I. Griffin

[57] ABSTRACT

A media advance system for swath-type printers for precisely positioning the media for successive swath printing. A dual photodiode line sensor is mounted on the print head. The diode active areas are separated by less than the line widths of lines printed in the media margin. Circuitry is provided to provide a signal indicative of the difference between the photocurrents produced by each photodiode. For the first swath of the page or plot, marginal lines are drawn by the first and Nth print device of the print head. Without moving the media, the line sensor is positioned over the marginal line printed by the first device, and the resulting difference signal is saved as a reference value. The media is then advanced until the same value of the difference signal is obtained from the line image of the marginal line drawn by the Nth print device. The media is then advanced a predetermined amount to precisely position the media for the next successive swath to be printed.

28 Claims, 14 Drawing Sheets

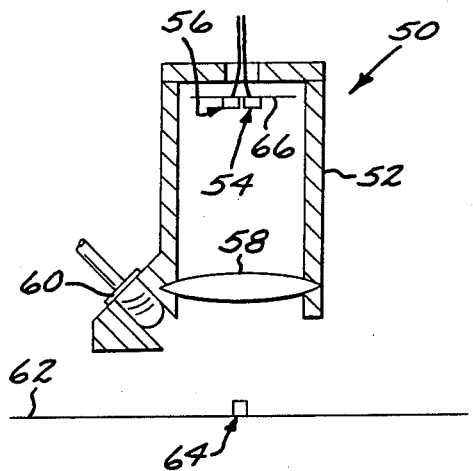
FIG.1
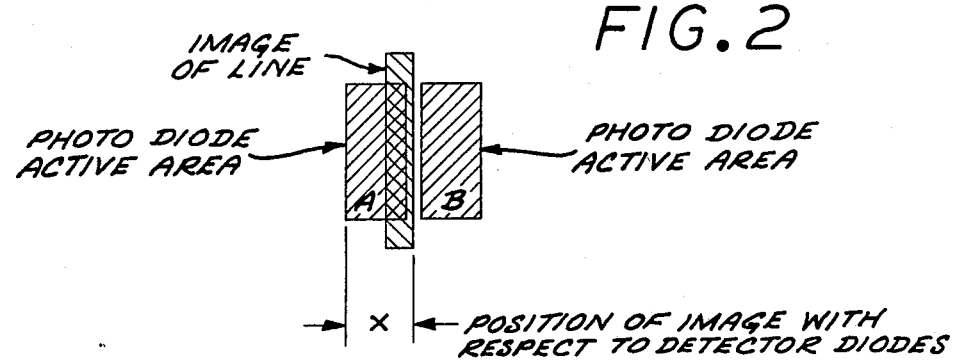
FIG.2
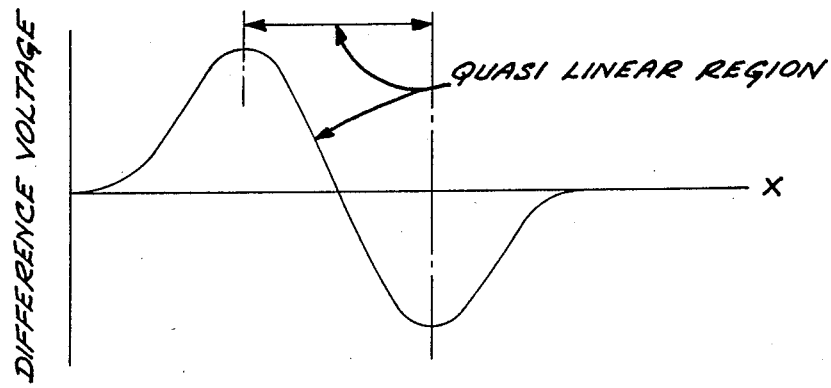

MEDIA ADVANCE SYSTEM FOR SWATH PRINTERS

BACKGROUND OF THE INVENTION

The present invention relates to swath-type printers, and more particularly to a media advance system for precisely advancing the media after printing each swath to position the media for the next swath without overlapping the previously printed swath or leaving a gap between the successively printed swaths.

Swath-type printers are well known in the art. These printers use a print head having a plurality of print devices mounted thereon. Typically the print head is mounted on a carriage for translational movement along a carriage scan axis. The media, such as a paper sheet, is transported along a media advance axis by a media advance system. The media advance axis and the scan axis are orthogonal. Thus, the print head is driven back and forth along the scan axis to print the successive swaths, with the media advance system advancing the media between each successive swath.

Print heads employing various types of printing devices are known in the art. A common type of print head employs ink jet nozzles as the print devices. Thus, the print head may include a multiplicity of N ink jet nozzles aligned with respect to the media advance axis.

A particular problem with swath-type printers is the positioning of the media for printing of successive swaths. If the media is not advanced far enough, successive swaths will be printed over a portion of the preceding swath, creating an overlapping band. If the media is advanced too far between each swath, there will be a band between the successive swaths on which no information is printed. Such bands can be particularly objectionable if the printer is used for printing high resolution graphics for example.

The precision of advancement of the media is affected by the mechanical systems. The need for precise positioning of the media is increased when the printer is a high resolution printer used for printing graphics with high resolution.

To attempt to solve this problem, media advance systems have been employed which require accurate mechanisms to advance the media accurately enough to eliminate the banding caused by swath advance error. Such systems are expensive due to the relative high cost required for the accurate mechanical systems. Systems have also been proposed which employ CCD sensor arrays to monitor the movement of one individual line for the advance. Such systems are subject to precise adjustment of the sensor magnification effects (i.e., the object distance would have to be carefully controlled to a preset amount.) Other proposed schemes cannot adjust for print-module to print-module errors (i.e., different swath widths from module to module).

SUMMARY OF THE INVENTION

It is therefore an object of this invention to provide a media advance system for swath-type printers which precisely positions the media for successive swaths and avoids banding due to swath advance error.

A further object of the invention is to provide an accurate media advance system which is relatively inexpensive to manufacture.

Another object of the invention is to provide a media advance system which automatically compensates for swath width variations from different print head modules, as in a system with disposable print cartridges, and which automatically compensates for small misalignments of the sensor-to-print head placement.

A media advance system is provided for a swath-type printer which includes a swath-type printing head comprising N equally spaced printing devices, and means for mounting the printing head for movement along a first predetermined axis. The printer further includes means for advancing the print media along a second predetermined axis substantially orthogonal to the first axis.

A line sensor is mounted adjacent a first one of the printing devices and carried by the mounting means, the line sensor comprising means for imaging lines drawn in the media margin. In the disclosed embodiment, the line sensor includes a dual photodiode pair, separated by less than the predetermined marginal line width. Circuitry is provided for providing a sensor signal indicative of the difference in the photocurrents produced by each photodiode.

A system controller is provided which is responsive to the line sensor signal for controlling the printing head and the media advance system for accurately advancing the media upon the printing of a swath. The controller includes means for causing the print head to print a initial swath with the media positioned appropriately for the beginning of a new plot or page, and to printing two marginal lines in the direction of the swath with the first printing device and with the last (Nth) printing device. The controller further includes means for centering in the swath direction the line sensor over the margin line drawn by the first print device without moving the media and storing the sensor output signal value as a reference signal indicative of the mounting error between the sensor and first printing device, and the electrical circuit offsets.

The controller further includes means for advancing the media to a position wherein the sensor provides an output signal equal to the reference value, indicating that the sensor is centered over the margin line drawn by the Nth printing device. Means are provided for advancing the media a predetermined amount equal to one printing device pitch, thereby accurately positioning the media for printing the next swath. The controller then causes the print head to print the next swath and a margin line printed by the Nth printing device.

BRIEF DESCRIPTION OF THE DRAWINGS

These and other features and advantages of the present invention will become more apparent from the following detailed description of an exemplary embodiment thereof, as illustrated in the accompanying drawings, in which:

FIG. 1 is a simplified cross-sectional view through a line sensor employed in the invention.

FIG. 2 is a plot showing the difference voltage of the sensor as a function of the position of the line image with respect to the active areas of the detector diodes of the line sensor.

DETAILED DESCRIPTION OF THE PREFERRED EMBODIMENTS

Figure 3:
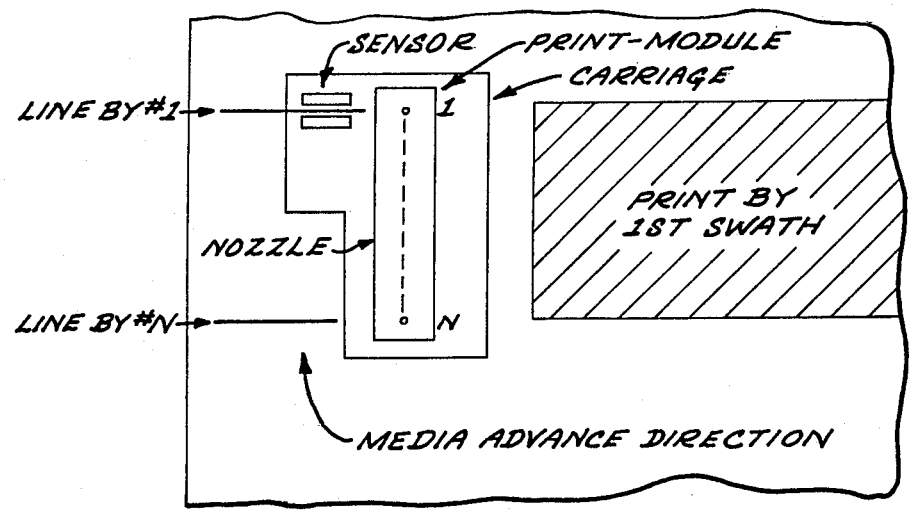
FIGS. 3 and 4 are exemplary diagrams of the relationship of the line sensor and marginal lines illustrating operation in accordance with the invention.
Figure 4:
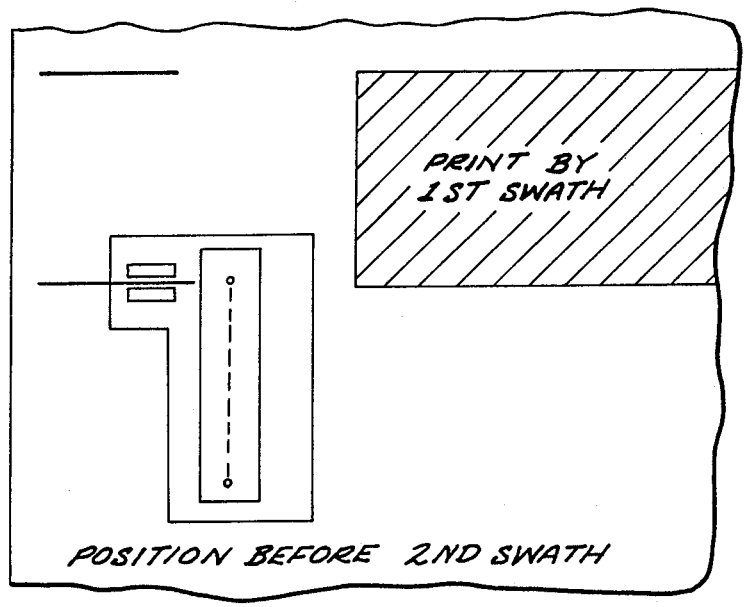

The invention is directed to a swath type printer, comprising a swath type printing head which includes N printing devices, e.g., equally spaced ink jet nozzles 1−N, for printing swaths on a print media such as paper. The print head is mounted on a translatable carriage for movement along a first axis, while a media advance system transports the media along a second axis which is orthogonal to the first axis. An exemplary swath printer which employs a carriage-mounted multiple ink jet print head is the HP model 3630A, marketed by Hewlett Packard.

Overview of the Invention

In accordance with the invention, a line sensor 50 is mounted on the print carriage for the print head near nozzle 1. FIG. 1 shows a simplified cross-sectional view of the line sensor 50 in accordance with the invention. The sensor 50 comprises housing 52 for mounting a dual photodiode detector in the image plane of the projection system comprising illumination source 60, the media 62, and lens 58. In a preferred embodiment, the lens 58 has a magnification power of one. Light from the source 60 is reflected off the surface of the media 62, which may have a marginal line 64 drawn thereon.

The sensor 50 comprises photodiodes 54 and 56 which are separated by a predetermined distance which is less than one image width of the line that is being sensed. The diode pair is mounted on a common planar substrate 66.

The image sensor 50 operates by imaging a line drawn in the margin upon the photodiode pair 54, 56. The photo currents from the respective photodiodes are converted to voltages, which are then subtracted to give a difference signal. A sum signal is also generated and used to control the illumination source to provide constant total photo current from the two photodiodes. This helps compensate for media reflectivity differences and illumination source aging.

As illustrated in FIG. 2, the individual active areas of the photodiodes 54, 56 of the sensor have a relatively large aspect ratio of length to width to improve the signal-to-noise ratio. An exemplary desirable aspect ratio is four. A photodiode suitable for the purpose is the CD-5116A-2D diode marketed by Centronic, 1101 Bristol Road, Mountainside, N.J. 07092. This improvement in the signal-to-noise ratio is the result of having the difference signal depend upon resulting placement of many ink jet drops in the line. It also averages over a larger background area and reduces the inaccuracies due to non-uniform reflectance of the media.

FIG. 2 illustrates the sensor system difference signal output for different line image positions relative to the active areas sensor photodiodes. The active area of each diode 54 and 56 is also shown in relation to the exemplary line image. The image position with respect to the detection diodes along the direction of the media motion is represented by the variable "x". The difference voltage as described above is plotted as a function of the variable x in FIG. 2, and as illustrated, the difference voltage function includes a quasi linear region wherein the difference voltage is substantially a linear function of the variable x for small increments in x about the position wherein the image is perfectly centered on the line sensor elements, i.e., the point at which the difference voltage is zero. By way of example, for a nominal marginal line width of about 0.005 inches and using the Centronic photodiodes referenced above, the x distance over which the quasi linear region extends is about 0.012 inches.

The operation of the media advance system employing the line sensor 50 in accordance with the invention includes the following steps:

1. With the media positioned appropriately for the beginning of a new plot or page, the first swath is printed with all the appropriate nozzles, and two lines are printed in the margin in the direction of the swath with nozzle 1 and nozzle N of the print head, under the assumption that the swath is N pixels high. This is illustrated in FIG. 3.

2. Without moving the media, the print head is positioned so that the line sensor is centered in the swath direction over the nozzle 1 line.

3. The line sensor output difference voltage is converted by an analog-to-digital converter to a digital value which is saved as a digital reference number. This reference number represents the mounting error between the sensor and the print head's nozzle 1, combined with the electrical offset in the line sensor system electronics.

4. If it is assumed that the mechanical offset between the sensor and print head and the electrical offset do not change significantly during the time to print a complete page (typically no more than a few minutes), then an accurate advance of the media can be effected by the following steps.

4.1 Move the print head to the swath position necessary to center the line sensor over the margin line drawn by the nozzle 1 in step 1.

4.2 Advance the media to a position that is nominally short of an N nozzle advance but within the range of the linear region of the line sensor. This position is determined by the controller using information about the nozzle pitch distance, the number of nozzles N, the media axis gear ratio, the number of lines on the media axis encoder, and the nominal linear range of the sensor. The sensor will generate a signal caused by the image of the line drawn by nozzle N in step 1. This is the coarse advance of the system.

4.3 Now advance the media until the sensor output voltage is equal to that stored in step 3 as the reference voltage for nozzle 1 position. The position of nozzle 1 of the print head in the media axis direction has now been placed (by moving the media) over the line formed by ink drops from nozzle N of the last swath, to position nozzle 1 for the next swath of printing.

4.4 At this point in the sequence of operation, there are two different options. One will usually be followed for the entire page. The options are as follows:

4.4.1 Print the next swath with no further media advance and during this swath also print another margin line with nozzle N. However, this swath cannot use nozzle 1 as this would print over the data layed down by nozzle N of the last swath. This would reduce the throughput of the system. Or:

4.4.2 With the assumption that the media advance errors are small for short advances, the media can be advanced by an additional one nozzle pitch advance (open loop with respect to the line sensor) and then print the next swath with all N nozzles including a margin line printed by nozzle N.

4.5 Continue by returning to step 4.1 until the page is completed.

4.6 Start a new plot or page by returning to step 1.

The Preferred Embodiment

Figure 5:
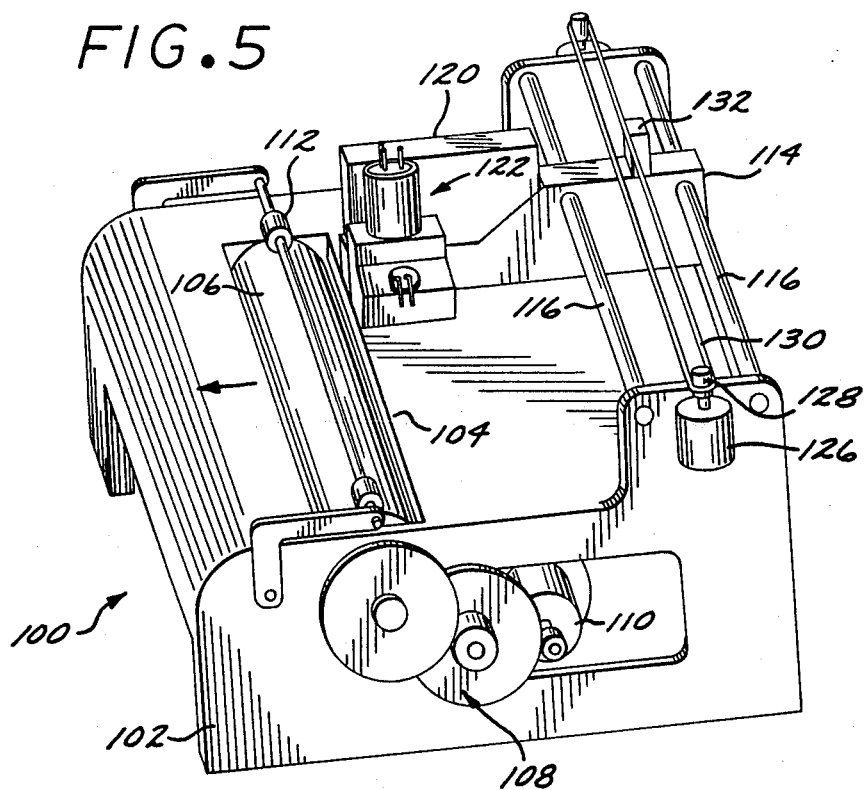
FIG. 5 is a perspective view of an exemplary swath printer employing the invention.

FIG. 5 illustrates a perspective view of a swath printer 100 employing the invention. The printer 100 comprises a housing 102 for supporting the printer elements. The housing 102 defines the writing platen surface 104 over which the media is transported by the paper axis drive roller 106. The driver roller 106 is driven by paper axis reduction gearing 108, in turn driven by a drive motor which comprises the paper axis drive motorencoder assembly 110. It is preferable that the media advance mechanism have high resolution, e.g., 200,000 possible positions per inch, but it need not have high accuracy. The assembly 110 further comprises a paper axis drive motor encoder to read the motor shaft displacement, and therefore provide an encoder signal indicative of the media advancement. A pinch roller 112 assists in advancing the media in the direction of the arrow shown in FIG. 5.

A carriage mounted on guide rails 114, 116 supports the ink jet print head 120 for translational movement along the scan axis parallel to the axis of the guide rails 114, 116. The print head comprises a plurality of aligned ink jet nozzles, nozzles 1−N. The nozzles are spaced apart by a predetermined distance, known as the nozzle "pitch." A scan axis driver motor and encoder assembly 126 drives the carriage 114 via drive pulley 128 and endless belt 130. The belt 130 is secured to the carriage 116 by belt securing fixture 132. Thus, the print head 120 may be driven along the scan axis to print a swath on the media positioned under the print head. A linear strip encoder as well as a stepping type motor for the scan axis may also be used to control the printer as is well known.

It will be appreciated that swath printers are well known in the art which utilize similar media drive systems using drive and pinch rollers, as well as guide rails and print head carriages as shown in FIG. 5. One exemplary swath printer which includes these elements and has been marketed by Hewlett Packard is the model 2225A swath printer.

Figure 6:
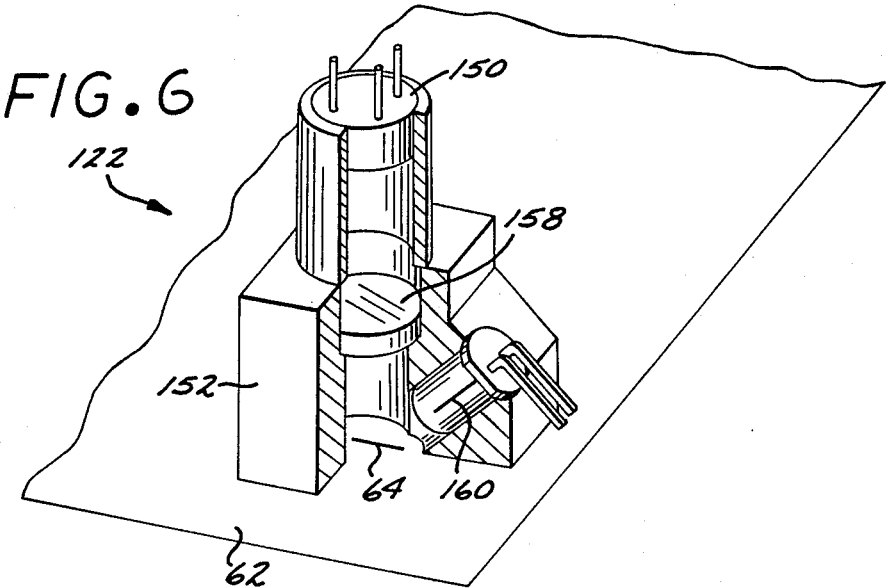
FIG. 6 is a broken-away diagram showing the line sensor employed in the swath printer of FIG. 5.

In accordance with the invention, a line sensor 122 is mounted on the carriage 114 adjacent nozzle 1 of the print head 120 for translational movement with the print head 120 along the carriage scan axis. FIG. 6 shows an embodiment of the line sensor 122, which is similar to the sensor of FIG. 1. The sensor housing 152 carries the dual photodiode detector 150, which comprises the two photodiodes (not shown in FIG. 6) in the same fashion as the sensor of FIG. 1. The housing also carries the lens 158, having a magnification power of one, and the illumination light source 160.

Figure 7:
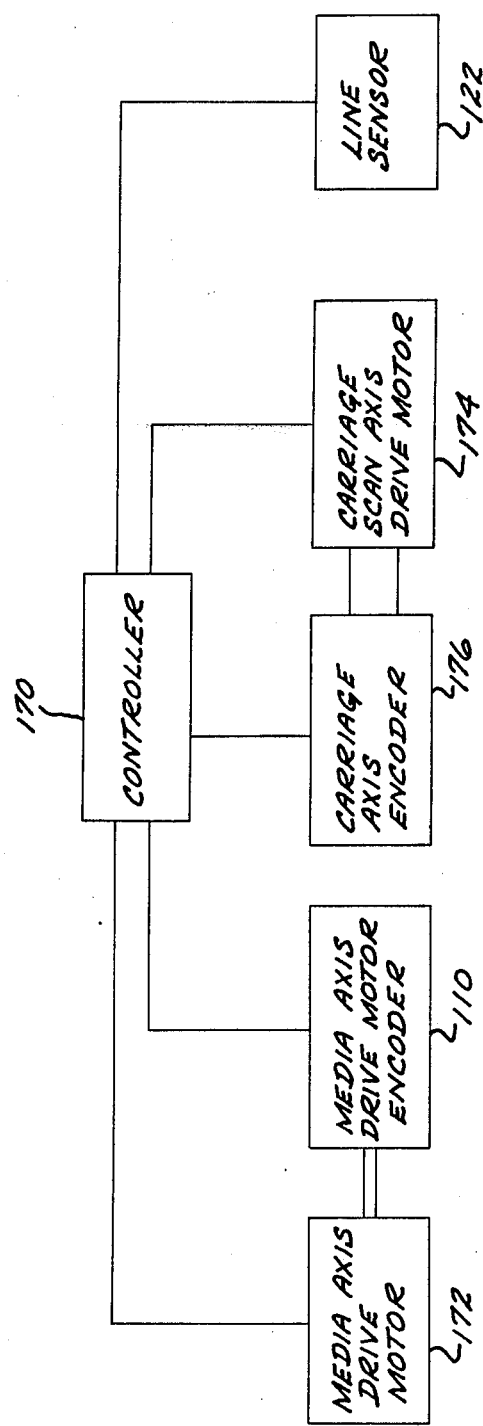
FIG. 7 is a simplified block diagram of the media advance control system of the swath printer of FIG. 5.

FIG. 7 is a simplified schematic block diagram showing the swath printer control system for advancing the media in accordance with the present invention. A central controller 170 provides motor drive control signals to the media axis drive motor 172 to advance the media. The controller 170 may comprise a microprocessor, such as the model 8051 device, marketed by Intel Corporation, and supporting chip set. Media advancement information is received by the controller 170 from the media axis drive motor encoder 110. The controller 170 also receives carriage positioning information from the carriage axis encoder 176, and provides motor drive control signals to the carriage scan axis drive motor 174 to drive the carriage along the scan axis. The controller 170 receives data from the line sensor 122 which is used to determine the appropriate media advancement signals to be provided to the drive motor 172.

Figure 8:
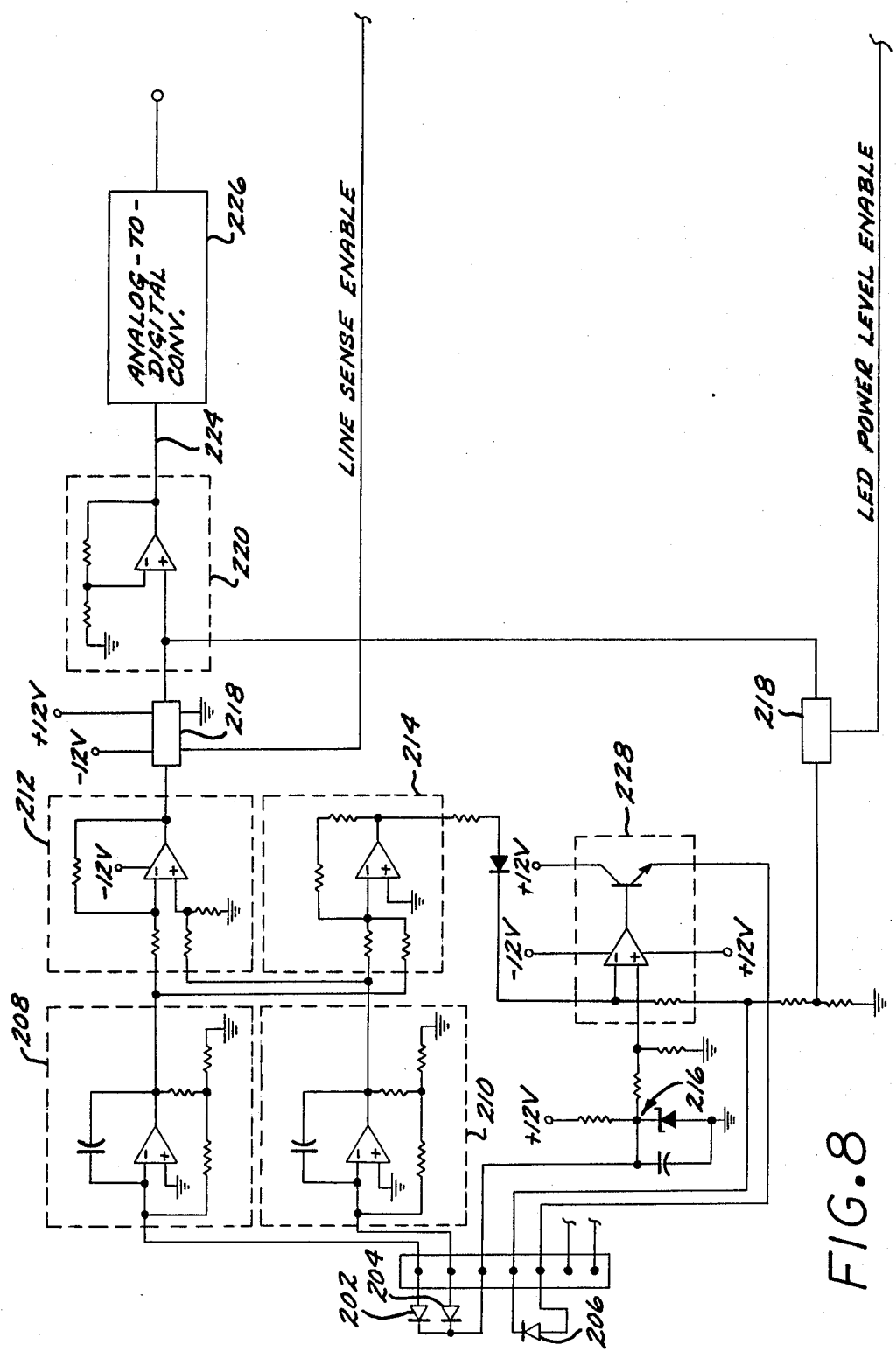
FIG. 8 is a schematic diagram of the line sensor circuitry.

Referring now to FIG. 8, a schematic of exemplary circuitry comprising the line sensor 122 for developing the sum and -difference signals from the sensor diodes and for driving the illumination source is disclosed. The two photodiodes 202 and 204 comprise photodiode sensor elements. The CD5116-2D diode marketed by Centronic is one commercially available photodiode which is suitable for this purpose. The illumination source is an ultrabright red light emitting diode 206. The HLMP 3750 diode marketed by Hewlett Packard is an example of a diode suitable for the purpose of the illumination source 206.

The anodes of diodes 202 and 204 are coupled to respective operational amplifier circuits 208 and 210 for conversion of the respective diode output photo currents into working voltages. The cathodes of diodes 202 and 204 are coupled to a 5.11 volt reference source 216.

The output of circuit 208 is coupled to the inverting input of operation amplifier circuit 212, while the output of amplifier circuit 210 is coupled to the noninverting input of the amplifier circuit 212. The circuit 212 is set up as a difference circuit, so that the output of the circuit 212 is proportional to the voltage difference between the outputs of the circuits 208 and 210. The output of the circuit 212 therefore comprises a first difference voltage signal indicative of the difference in the respective output currents of the two sensor diodes 202 and 204. The output of circuit 212 is passed through an analog switch 218 for selectively switching to an output buffer amplifier 220. The output signal on line 224 is coupled to analog-to-digital converter (ADC) 226, for conversion of the analog difference signal to a corresponding digital signal which may be read by the microprocessor comprising the controller 170.

The outputs of the two amplifier circuits 208 and 210 are also coupled to a summing mode at the inverting input of operational amplifier circuit 214. The noninverting input of the amplifier circuit is coupled to ground potential. Thus, the circuit 214 is set up to develop an output voltage signal representative of the sum of the photo currents produced by the photodiodes 202 and 204. This sum signal is input to the inverting input of operational amplifier circuit 228. The non-inverting input is connected to a resistive voltage divider which, with an input from the voltage reference 216 provides the reference for the illumination control amplifier 228. The amplifier circuit 228 include a drive transistor 230 whose output is used to drive the illumination source diode 206. Thus, the sum signal is employed to set the illumination level of the line sensor 122. The amplifier circuit is biased to drive the illumination source 206 so as to maintain a constant total photocurrent level from the two photodiodes 202 and 240.

Figure 9:
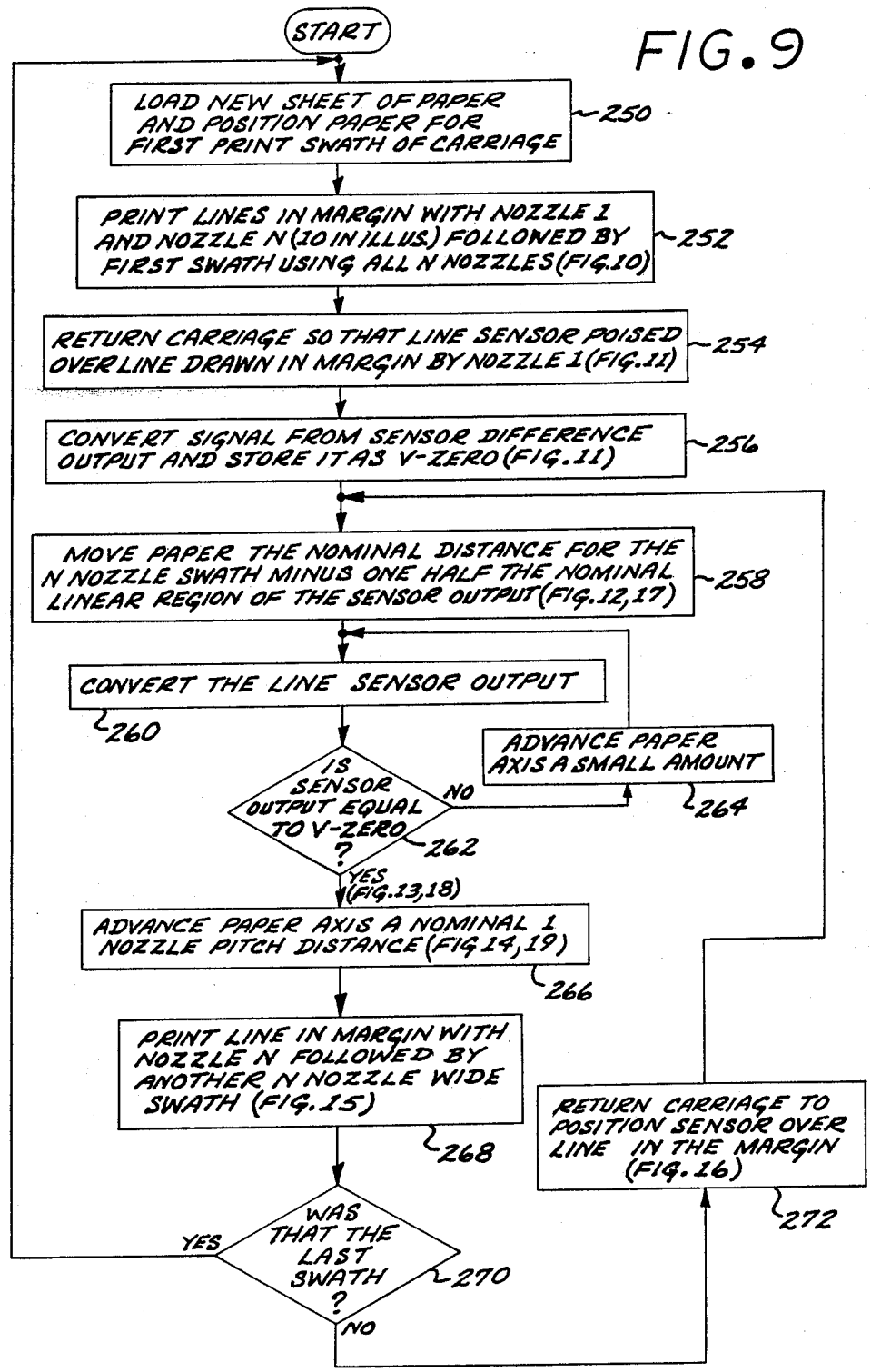
FIG. 9 is a simplified flow diagram of one preferred operation of the media advance system of FIG. 5.
Figure 10:
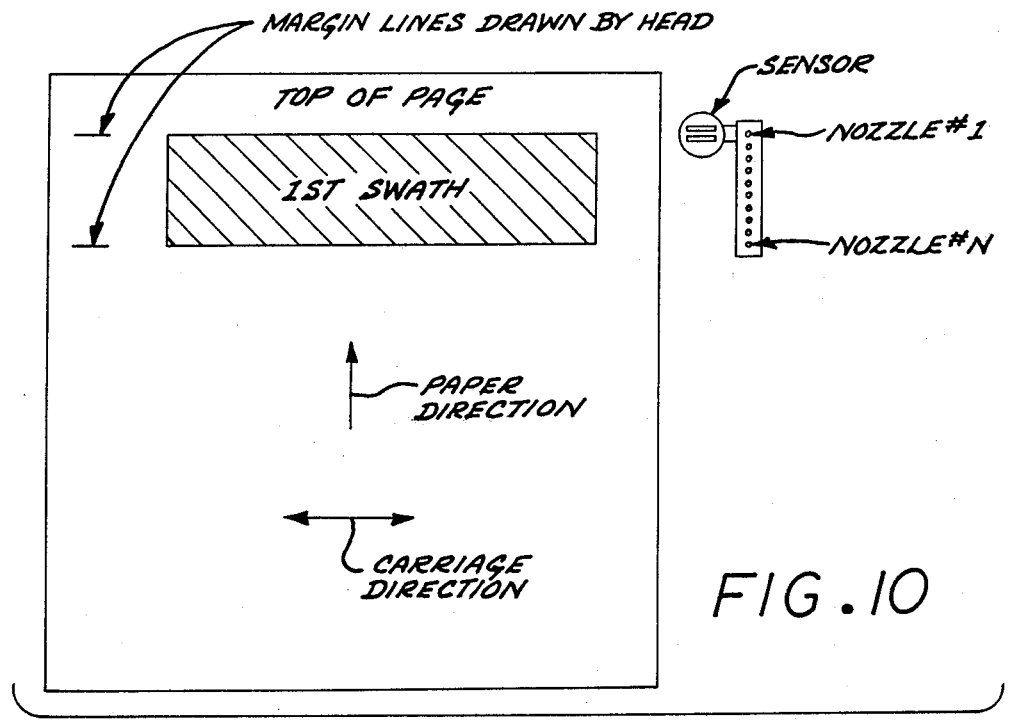
FIGS. 10–19 are diagrams showing the relative positions of the line sensor and the media at various steps during the operation of the swath printer of FIG. 5 as described in FIG. 9.

The operation of the system 100 of FIGS. 5-8 is further described with reference to FIGS. 9-19. FIG. 9 is a simplified flow diagram illustrative of the sequence of steps carried out in the media advance system, and implementing step 4.4.2 described above. FIGS. 10-19 show the print head and the print media in various positions after corresponding steps have been carried out.

At step 250 (FIG. 9), a new sheet of paper is loaded and positioned for the first print swath by the print head. Lines are then printed in the margin with nozzle 1 and N (N=10 in FIGS. 10-19), followed by the printing of the first swath using all N nozzles in the conventional manner (step 252).

Figure 11:
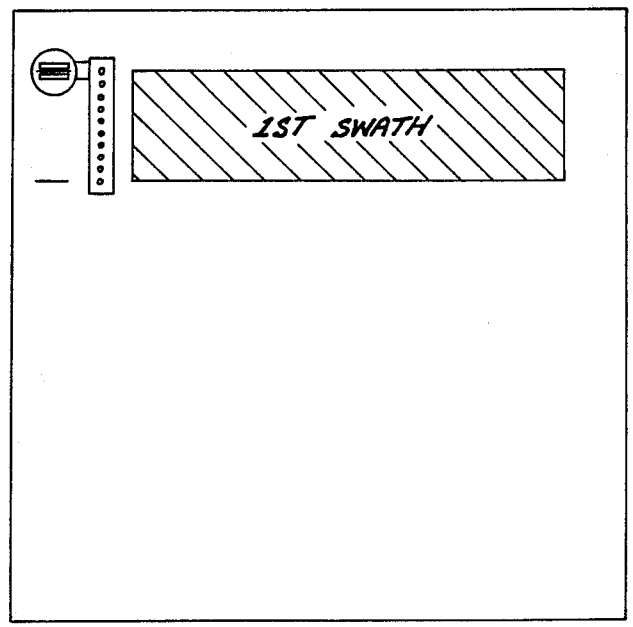

At step 254, the print head is returned so that the line sensor is poised over the marginal line drawn by nozzle 1. The corresponding difference voltage signal from the line sensor is converted to a digital value and stored in memory as V-zero (step 256). This is illustrated in FIG. 11.

Figure 12:
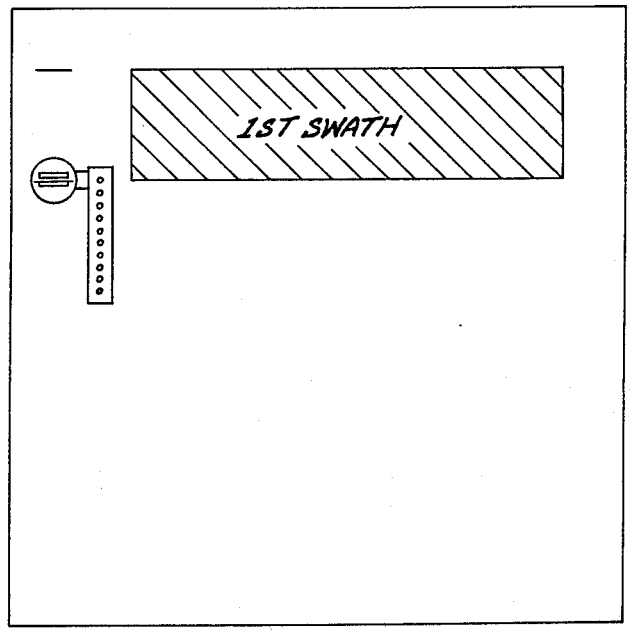

The paper is moved (open loop with respect to the line sensor) the nominal distance for the N nozzle swath minus one-half the nominal linear region of the sensor output. The resultant position of the head in relation to the marginal line is shown in FIG. 12.

Th nominal distance the paper is moved may be calculated by the controller. Assume that the print head has 10 nozzles, and is capable of printing 200 dots per inch, i.e., the pitch is 200 dots per inch. The nominal advance distance D is equal to $(N-1)/(pitch(dots/inch))$ minus one-half the sensor linear range.

$$D = ((N-1)/(pitch)) - ((sensor\ linear\ range)/2)$$

For example, if the pitch is 200 dots per inch, the number N of nozzles is 10, and the sensor linear range (FIG. 2) is 0.012 inches, then the nominal advance distance D is calculated as 0.039 inches. If the number N of nozzles is 100, then the nominal advance D distance is 0.489 inches.

Figure 13:
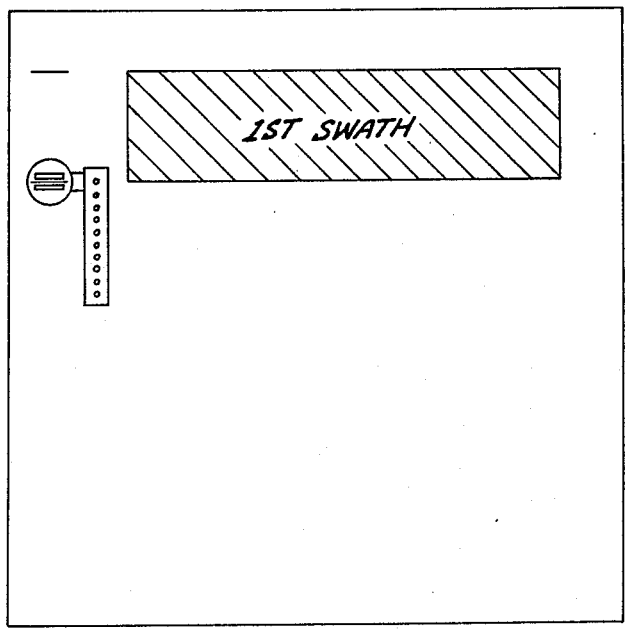

At step 260, the line sensor output is converted to a digital value, and compared with the stored value for V-zero (step 262). If the sensor output does not equal V-zero, then the paper is advanced a predetermined small amount, for example 0.0001 inches (step 246), and operation returns to step 260. When the sensor output equals v-zero, the position of the print head in relation to the marginal line will be as shown in FIG. 13.

Figure 14:
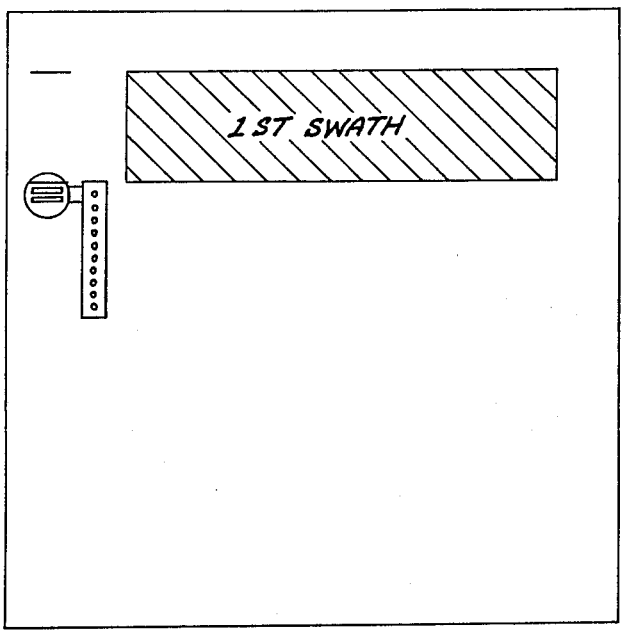
Figure 15:
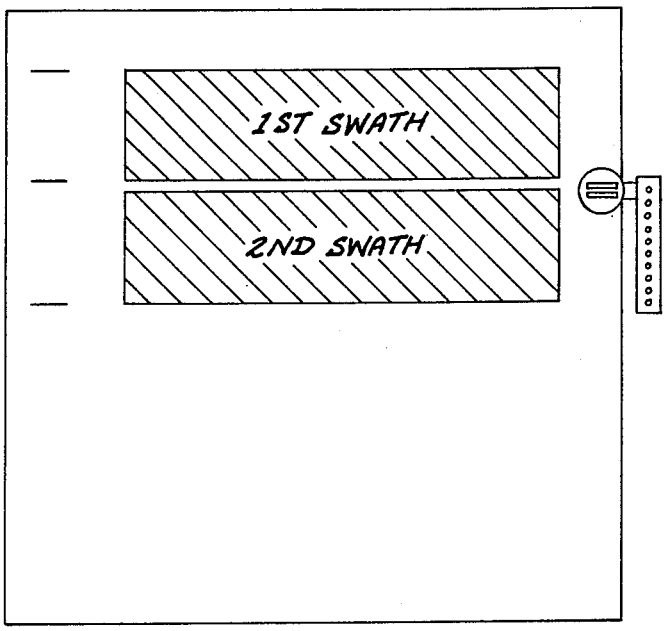

The paper is then advanced a nominal 1 nozzle pitch distance, as shown in FIG. 14. A marginal line is now printed with nozzle N, followed by another N nozzle wide swath (step 268) as shown in FIG. 15. If the last swath was printed (step 270), then operation loops back to step 250 to load a new sheet of paper into position, and commence printing a new sheet.

Figure 16:
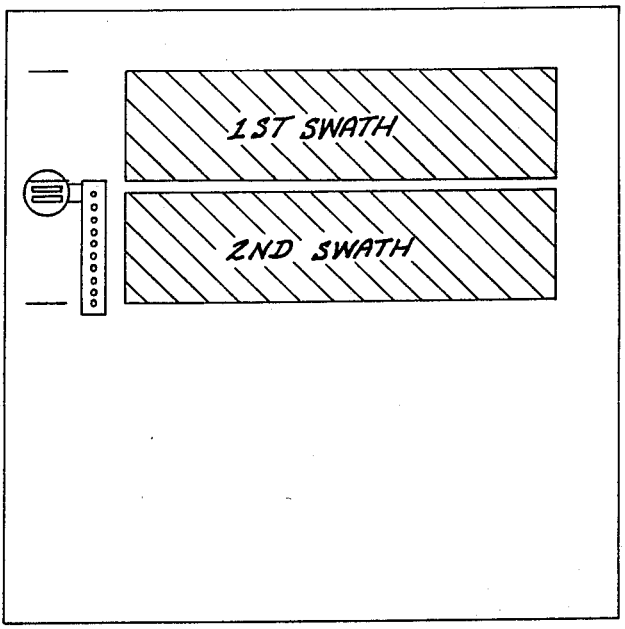
Figure 17:
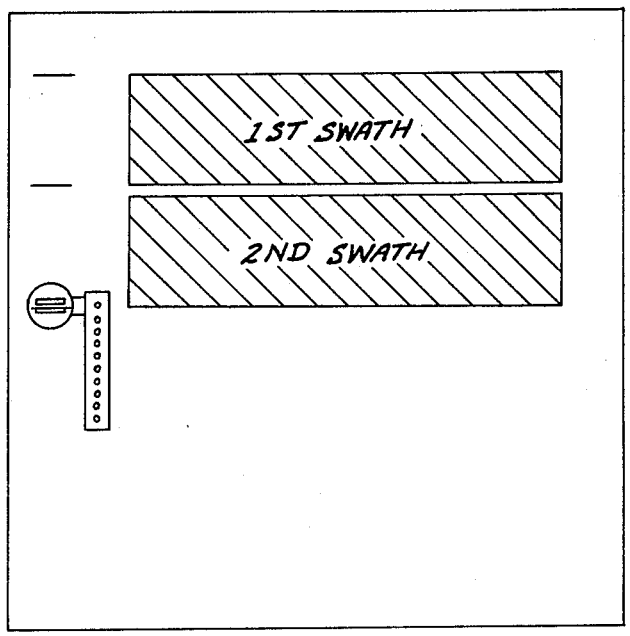
Figure 18:
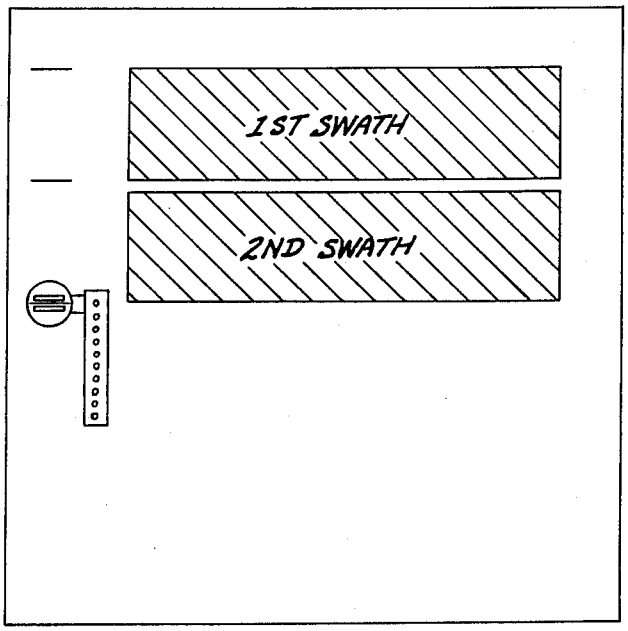
Figure 19:
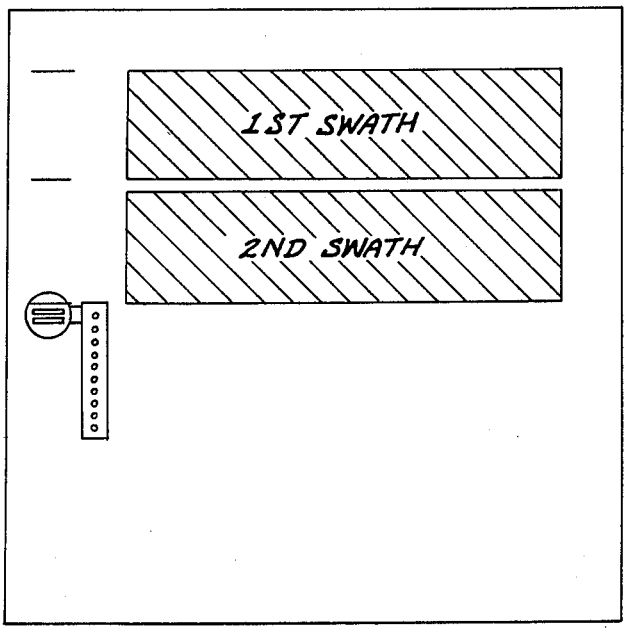

At step 272, the print head is positioned so that the line sensor is poised over the region of the line in the margin, as shown in FIG. 16. Operation then returns to step 258 to repeat the sequence until the last swath has been printed, as shown in FIGS. 17-19.

Figure 20:
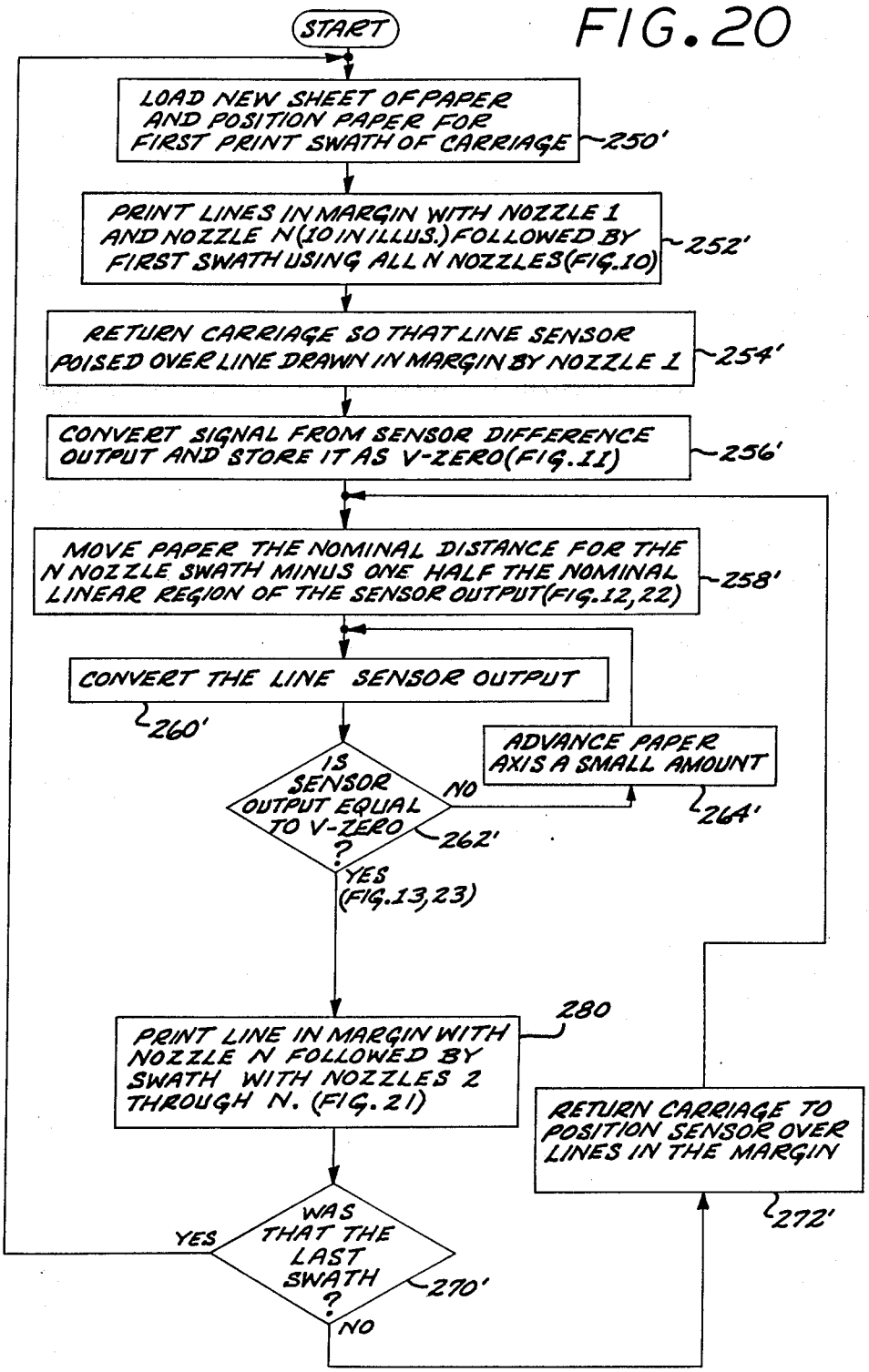
FIG. 20 is a simplified flow diagram of another preferred operation of the media advance system of FIG. 5.
Figure 21:
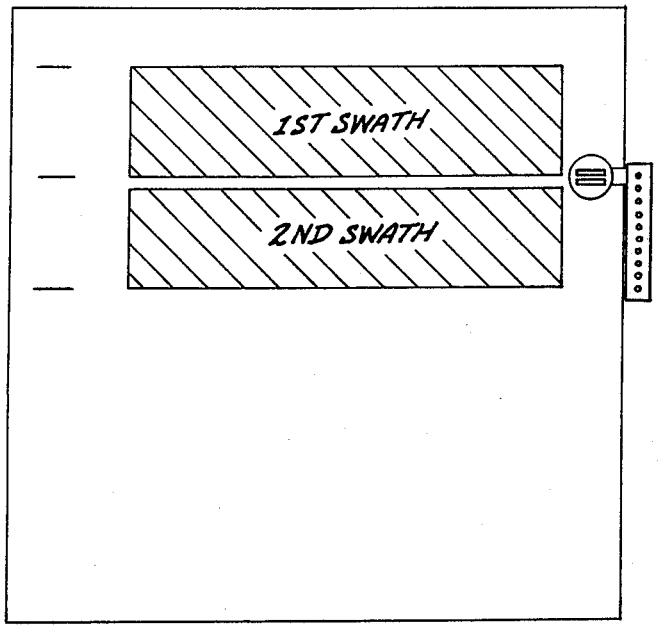
FIGS. 21–23 show the relative positions of the line sensor and the media at various steps during operation of the media advance system described in FIG. 20.
Figure 22:
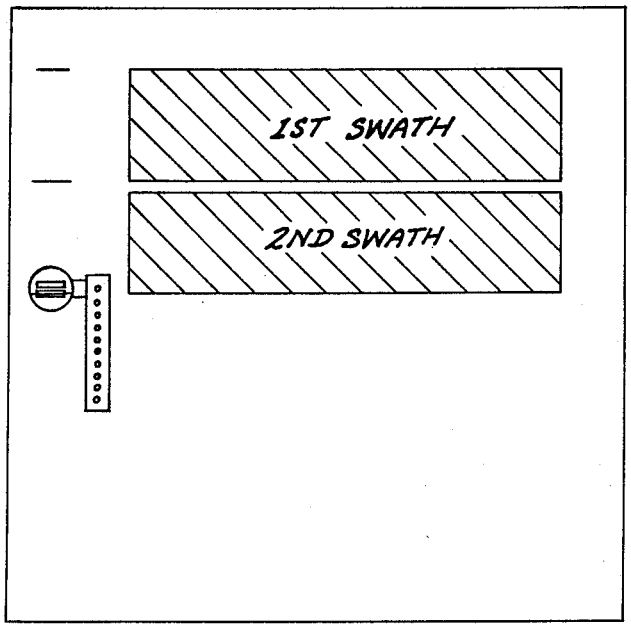
Figure 23:
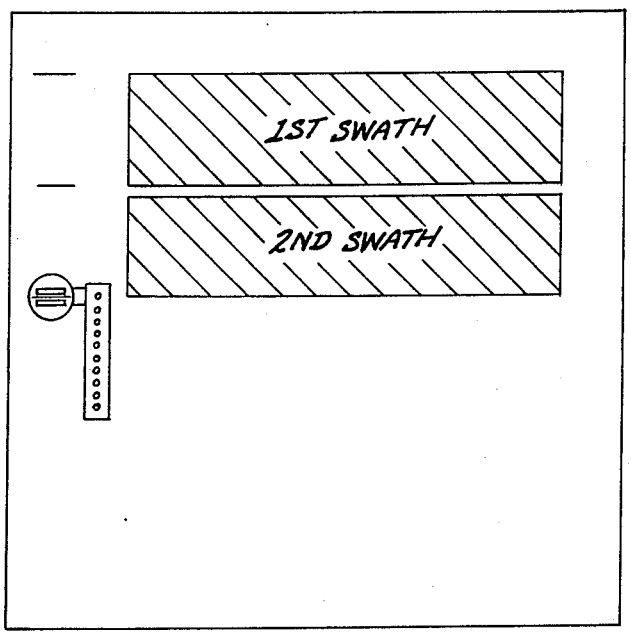

Referring now to FIG. 20, a flow diagram of the system operation is shown, implementing alternative step 4.4.1 described above. Steps 250', 252', 254', 258', 260', 262', 264', 270' and 272' are similar to the corresponding steps 250, 252, 254, 256, 258, 260, 262, 264, 268 and 272 of FIG. 9, except that step 258' refers to FIGS. 12 and 22, and step 262' refers to FIGS. 13 and 23. At step 280, however, the second swath printed, as well as all subsequent swaths for that page, are printed with nozzles 2 through N of the print head as represented in FIG. 21. Nozzle 1 is not used to prevent printing over the prior swath. Subsequent swaths for that page are printed with nozzles 2 through N of the print head, as represented in FIG. 21.

A media advance system and method has been disclosed for accurately advancing the media for printing of successive swaths by a swath printer. The advantages of the invention include:

1. Accurate advancement of the media between successive swaths to avoid banding of the resulting plot or printed product.

2. The system does not require an accurate mechanical advance apparatus, thereby resulting in lower cost.

3. The computational burden for advancing the media is relatively light, so that the swath printing is not significantly slowed by the operation of the system.

4. The system automatically compensates for swath width variations from different print heads as in a system with disposable print cartridges.

5. The system automatically compensates for small misalignments of the sensor-to-print head placement.

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. A media advance system for a swath printer, comprising:
   a swath-type printing head, said head comprising N spaced printing devices;
   means for mounting said printing head for movement along a first predetermined axis;
   means for advancing the print media along a second predetermined axis substantially orthogonal to the first axis;
   a line sensor mounted adjacent a first one of said printing devices and carried by said mounting means, said line sensor comprising means for imaging lines drawn in the media margin;
   system controller responsive to said line sensor for controlling said printing head and said media advancing means for accurately advancing said media upon the printing of a swath, said controller comprising, in combination with said print head, said mounting means and said media advancing means:
   (i) means for printing an initial swath with said media positioned appropriately for the beginning of a new plot or page, and for printing two marginal lines in the direction of the swath with the first printing device and with the Nth printing device;
   (ii) means for positioning in the swath direction the line sensor over the margin line drawn by said first print device without moving the media from the position at which the first swath was printed, and storing the sensor output signal value as a reference signal indicative of the mounting error between said sensor and the first printing device; and
   (iii) means for printing the next and successive swaths, comprising means for advancing the media to a position wherein the sensor provides an output signal equal to said reference value, indicating that the sensor is centered over a marginal line drawn by said Nth printing device, means for advancing the media a predetermined amount equal to one printing device pitch; and means for printing the next swath and a margin line printed by said Nth printing device.

2. The media advance system of claim 1 wherein said line sensor comprises first and second spaced photoelectric elements responsive to incident light intensities for providing a corresponding output signal, and means for projecting an image of a portion of the media surface onto said photoelectric elements.

3. The media advance system of claim 2 wherein said marginal lines drawn by said first and Nth printing devices have predetermined nominal line width, and the active areas of said first and second photoelectric elements are spaced apart by less than said nominal line width.

4. The media advance system of claim 3 further comprising means for providing a signal indicative of the difference between the photocurrents produced by said first and second photoelectric elements, said signal comprising said sensor output signal.

5. The media advance system of claim 4 further comprising means for digitizing said output signal, and said controller comprises a digital computer responsive to said digitized output signal.

6. The media advance system of claim 3 wherein first and second photoelectric elements comprise first and second photodiodes each having an active region characterized by an aspect ratio of the length-to-width greater than 4.

7. The media advance system of claim 2 wherein said means for projecting said image comprises:
an illumination source for projecting illumination light onto the media surface; and
a lens for imaging the reflected illumination light at an image plane; and
wherein said first and second photoelectric elements are mounted on a substrate disposed at said image plane.

8. The media advance system of claim 1 wherein said media advancing means comprises means for advancing the media in very small increments of 0.0001 inches or less.

9. The media advance system of claim 7 further comprising means for providing a sum signal indicative of the total photo current produced by said first and second photodiodes, and means responsive to said sum signal for adaptively driving the illumination source to adapt the line sensor to different media reflectivities.

10. For a media advance system for a swath printer, comprising a swath-type printing head, with N spaced printing devices means for mounting said printing head for movement along a first predetermined axis, means for advancing the print media along a second predetermined axis substantially orthogonal to the first axis, and a line sensor mounted adjacent a first one of said printing devices and carried by said mounting means, said line sensor comprising means for imaging lines drawn in the media margin, a method for controlling said printing head and said media advancing means for accurately advancing said media upon the printing of a swath, comprising a sequence of the following steps:
(i) printing an initial swath with said media positioned appropriately for the beginning of a new plot or page, and printing two marginal lines in the direction of the swath with the first printing device and with the Nth printing device;
(ii) centering in the swath direction the line sensor over said margin line drawn by said first print device without moving the media from the position at which the first swath was printed, and storing the sensor output signal value as a reference signal indicative of the mounting error between said sensor and the first printing device;
(iii) advancing the media to a position wherein the sensor provides an output signal equal to said reference value, indicating that the sensor is centered over the marginal line drawn by said Nth printing device;
(iv) advancing the media a predetermined amount equal to one printing device pitch;
(v) printing the next swath and a margin line printed by said Nth printing device; and
(vi) repeating steps (iii), (vi) and (v) until the plot or page is complete.

11. The method of claim 10 wherein said line sensor comprises first and second spaced photoelectric elements responsive to incident light intensities for providing a corresponding output signal, and means for projecting an image of a portion of the media surface onto said photoelectric elements.

12. The method of claim 11 wherein said marginal lines drawn by said first and second printing devices have a predetermined nominal line width, and the active areas of said first and second photoelectric elements are spaced apart by less than said nominal line width.

13. The method of claim 11 wherein said sensor is further characterized by means for providing a sensor output signal which is indicative of the difference between the photocurrents produced by said first and second photoelectric elements.

14. For media advance system for a swath printer, comprising a swath-type printing head with N spaced printing devices, means for mounting said printing head for movement along a first predetermined axis, means for advancing the print media along a second predetermined axis substantially orthogonal to the first axis, and a line sensor mounted adjacent a first one of said printing devices and carried by said mounting means, said line sensor comprising means for imaging lines drawn in the media margin, a method for controlling said printing head and said media advancing means for accurately advancing said media upon the printing of a swath, comprising a sequence of the following steps:
(i) printing an initial swath with said media positioned appropriately for the beginning of a new plot or page, and printing two marginal lines in the direction of the swath with the first printing device and with the Nth printing device;
(ii) positioning in the swath direction the line sensor over said margin line drawn by said first print device without moving the media and storing the sensor output signal value as a reference signal indicative of the mounting error between said sensor and the first printing device;
(iii) advancing the media to a position wherein the sensor provides an output signal equal to said reference value, indicating that the sensor is centered over a marginal line drawn by said Nth printing device;

(iv) printing the next swath and a margin line printed by said Nth printing device, without using the first printing device; and (v) repeating steps (iii) and (iv) until the plot or page is completed.

15. The method of claim 14 wherein said line sensor comprises first and second spaced photoelectric elements responsive to incident light intensities for providing a corresponding output signal, and means for projecting an image of a portion of the media surface onto said photoelectric elements.

16. The method of claim 15 wherein said marginal lines drawn by said first and second printing devices have predetermined nominal line width, and the active areas of said first and second photoelectric elements are spaced apart by less than said nominal line width.

17. The method of claim 15 wherein said sensor is further characterized by means for providing a sensor output signal which is indicative of the difference between the photocurrents produced by said first and second photoelectric elements.

18. A media advance system for a swath printer, comprising:
   a swath-type printing head, said head comprising N spaced printing devices;
   means for mounting said printing head for movement along a first predetermined axis;
   means for advancing the print media along a second predetermined axis substantially orthogonal to the first axis;
   a line sensor mounted adjacent a first one of said printing devices and carried by said mounting means, said line sensor comprising means for imaging lines drawn in the media margin;
   system controller responsive to said line sensor for controlling said printing head and said media advancing means for accurately advancing said media upon the printing of a swath, said controller comprising, in combination with said print head, said mounting means and said media advancing means:
   (i) first means for printing an initial swath with said media positioned appropriately for the beginning of a new plot or page, and for printing two marginal lines in the direction of the swath with the first printing device and with the Nth printing device;
   (ii) means for positioning in the swath direction the line sensor over said margin line drawn by said first print device without moving the media from the position at which the first swath was printed, and storing the sensor output signal value as a reference signal indicative of the mounting error between said sensor and the first printing device;
   (iii) means for advancing the media to a position wherein the sensor provides an output signal equal to said reference value, indicating that the sensor is positioned over the marginal line drawn by said Nth printing device; and
   (v) second means for printing the next swath and a margin line printed by said Nth printing device without overlapping the previously printed swath.

19. The media advance system of claim 18 wherein said second means comprises means for advancing the media a predetermined distance from the position at which the line sensor was centered over the marginal line drawn by said Nth printing device, and means for printing the next swath using all N printing devices.

20. The media advance system of claim 18 wherein said second printing means comprises means for printing said next swath and marginal line without advancing the media from the position at which the line sensor was centered over the marginal line printed by the Nth print device, said means including using only the second through Nth print device to print the next swath.

21. The media advance system of claim 18 wherein said line sensor comprises first and second spaced photoelectric elements responsive to incident light intensities for providing a corresponding output signal, and means for projecting an image of a portion of the media surface onto said photoelectric elements.

22. The media advance system of claim 21 wherein said marginal lines drawn by said first and second printing devices have predetermined nominal line width, and the active areas of said first and second photoelectric elements are spaced apart by less than said nominal line width.

23. The media advance system of claim 22 further comprising means for providing a signal indicative of the difference between the photocurrents produced by said first and second photoelectric elements, said signal comprising said sensor output signal.

24. The media advance system of claim 23 further comprising means for digitizing said output signal, and said controller comprises a digital computer responsive to said digitized output signal.

25. The media advance system of claim 22 wherein first and second photoelectric elements comprise first and second photodiodes each having an active region characterized by an aspect ratio of the length-to-width greater than 4.

26. The media advance system of claim 21 wherein said means for projecting said image comprises:
   an illumination source for projecting illumination light onto the media surface; and
   a lens for imaging the reflected illumination light at an image plane; and
   wherein said first and second photoelectric elements are mounted on a substrate disposed at said image plane.

27. The media advance system of claim 18 wherein said media advancing means comprises means for advancing the media in very small increments of 0.0001 inches or less.

28. The media advance system of claim 26 further comprising means for providing a sum signal indicative of the total photo current produced by said first and second photodiodes, and means responsive to said sum signal for adaptively driving the illumination source to adapt the line sensor to different media reflectivities.

* * * * *